United States Patent
Mizuno

(10) Patent No.: US 11,454,771 B2
(45) Date of Patent: Sep. 27, 2022

(54) OPTICAL TRANSCEIVER

(71) Applicant: Sumitomo Electric Industries, Ltd., Osaka (JP)

(72) Inventor: Yasutaka Mizuno, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 17/162,430

(22) Filed: Jan. 29, 2021

(65) Prior Publication Data

US 2021/0239924 A1 Aug. 5, 2021

(30) Foreign Application Priority Data

Jan. 30, 2020 (JP) .............................. JP2020-013912

(51) Int. Cl.
*H04B 10/00* (2013.01)
*G02B 6/42* (2006.01)

(52) U.S. Cl.
CPC ......... *G02B 6/4246* (2013.01); *G02B 6/4221* (2013.01); *G02B 6/4277* (2013.01); *G02B 6/4292* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,917,648 A * | 6/1999 | Harker | ................ | H01S 3/06704 359/341.3 |
| 5,920,668 A * | 7/1999 | Uehara | ............... | H01S 3/06704 385/27 |
| 6,802,652 B1 * | 10/2004 | Sacchetto | ............ | G02B 6/4453 385/135 |
| 7,359,641 B2 * | 4/2008 | Dallesasse | ........... | G02B 6/4277 398/135 |
| 8,376,634 B2 * | 2/2013 | Oki | ...................... | G02B 6/4243 385/92 |
| 8,821,039 B2 * | 9/2014 | Matsui | ................ | G02B 6/4277 385/92 |

(Continued)

FOREIGN PATENT DOCUMENTS

| | | |
|---|---|---|
| JP | 2011-118337 A | 6/2011 |
| JP | 2013-257461 A | 12/2013 |

(Continued)

*Primary Examiner* — Agustin Bello
(74) *Attorney, Agent, or Firm* — Baker Botts L.L.P.; Michael A. Sartori

(57) ABSTRACT

An optical transceiver includes a housing and an optical receptacle; optical subassemblies each having a sleeve and being configured to perform a photoelectric conversion, the sleeve facing to the optical receptacle; inner fibers each connected to the sleeve one to one; and a tray having a holding part and a guiding part, the holding part holding the optical subassemblies in line, the guiding part being formed on both outer sides of the holding part and a folding back area on an opposite side of the optical receptacle. The guiding part includes a pair of passage parts. The inner fiber passes through one of the passage parts, the folding back area, and another of the passage parts in this order within the tray so as to face the optical receptacle again when the another of the passage parts is closer to the sleeve than the one of the passage parts.

6 Claims, 9 Drawing Sheets

(56) References Cited

U.S. PATENT DOCUMENTS

| | | | |
|---|---|---|---|
| 9,306,671 B2* | 4/2016 | Ho | H04J 14/025 |
| 9,319,142 B2* | 4/2016 | Kato | G02B 6/4213 |
| 9,871,590 B2* | 1/2018 | Matsui | G02B 6/4246 |
| 10,502,909 B2* | 12/2019 | Minota | G02B 6/4278 |
| 10,558,063 B2* | 2/2020 | Sugaya | G02F 1/015 |
| 10,578,802 B2* | 3/2020 | Minota | G02B 6/255 |
| 10,754,091 B1* | 8/2020 | Nagarajan | H01S 5/02375 |
| 10,812,193 B2* | 10/2020 | Matsui | G02B 6/4246 |
| 11,036,017 B2* | 6/2021 | Tittenhofer | G02B 6/4256 |
| 11,204,464 B2* | 12/2021 | Minota | G02F 1/025 |
| 2005/0036746 A1* | 2/2005 | Scheibenreif | G02B 6/4201 |
| | | | 385/92 |
| 2006/0274394 A1* | 12/2006 | Riley | G02B 7/003 |
| | | | 359/15 |
| 2011/0103797 A1* | 5/2011 | Oki | G02B 6/4243 |
| | | | 398/79 |
| 2011/0225792 A1 | 9/2011 | Oki et al. | |
| 2011/0229095 A1 | 9/2011 | Oki | |
| 2011/0229096 A1 | 9/2011 | Oki | |
| 2011/0255831 A1 | 10/2011 | Oki et al. | |
| 2011/0262078 A1 | 10/2011 | Oki et al. | |
| 2011/0280524 A1* | 11/2011 | Oki | G02B 6/4246 |
| | | | 385/94 |
| 2012/0237171 A1* | 9/2012 | Oki | G02B 6/4277 |
| | | | 385/78 |
| 2012/0237223 A1 | 9/2012 | Matsui et al. | |
| 2014/0010551 A1* | 1/2014 | Kurashima | G02B 6/4246 |
| | | | 398/135 |
| 2015/0104177 A1* | 4/2015 | Kato | G02B 6/4246 |
| | | | 398/79 |
| 2015/0268435 A1* | 9/2015 | Blackwell, Jr. | G02B 6/4455 |
| | | | 385/135 |
| 2015/0326319 A1* | 11/2015 | Oki | H04B 10/556 |
| | | | 398/135 |
| 2016/0103286 A1* | 4/2016 | Matsui | G02B 6/4246 |
| | | | 398/139 |
| 2016/0266336 A1* | 9/2016 | Oki | H04B 10/40 |
| 2018/0113262 A1* | 4/2018 | Aoki | G02B 6/4448 |
| 2018/0149814 A1* | 5/2018 | Minota | G02B 6/4278 |
| 2018/0231726 A1* | 8/2018 | Mizuno | H04B 10/505 |
| 2018/0343062 A1* | 11/2018 | Voois | H04B 10/58 |
| 2019/0243077 A1* | 8/2019 | Meunier | G02B 6/444 |
| 2019/0327000 A1* | 10/2019 | Kurokawa | G02B 27/0961 |
| 2019/0353844 A1* | 11/2019 | Nakanishi | G02B 6/30 |
| 2020/0150366 A1* | 5/2020 | Tittenhofer | G02B 6/4256 |
| 2020/0195350 A1* | 6/2020 | Matsui | G02B 6/4281 |
| 2020/0322057 A1* | 10/2020 | Cai | H04B 10/40 |
| 2020/0393632 A1* | 12/2020 | Wallace | G02B 6/4453 |
| 2021/0165174 A1* | 6/2021 | Minota | H01S 3/10 |
| 2021/0223490 A1* | 7/2021 | Matsui | G02B 6/4246 |
| 2021/0239924 A1* | 8/2021 | Mizuno | G02B 6/4272 |
| 2021/0364713 A1* | 11/2021 | Ariga | G02B 6/4267 |
| 2021/0389535 A1* | 12/2021 | Yagisawa | G02B 6/426 |

FOREIGN PATENT DOCUMENTS

| | | |
|---|---|---|
| JP | 2015-025868 A | 2/2015 |
| WO | 2011/052802 A2 | 5/2011 |

* cited by examiner

OPTICAL TRANSCEIVER

CROSS-REFERENCE TO RELATED APPLICATION

This application claims priority from Japanese Patent Application No. 2020-013912, filed on Jan. 30, 2020, the entire subject matter of which is incorporated herein by reference.

TECHNICAL FIELD

An aspect of the present disclosure relates to an optical transceiver

BACKGROUND

Japanese Patent Application Publication No. 2013-257461 discloses an optical module including a housing, an external connecting optical connector, an optical filter, a first substrate, a second substrate, a fiber-housing tray disposed on a back surface of the first substrate, and a plurality of optical fibers. On a front surface of the first substrate, a transmitting unit including a TOSA (transmitter optical sub-assembly) for transmitting light to the outside of the optical module and a receiving unit including a ROSA (receiver optical sub-assembly) for receiving light from the outside of the optical module are provided. The plurality of optical fibers includes the optical fiber extending to the ROSA from a reception terminal of the external connecting optical connector, the optical fibers extending from each of a plurality of the TOSAs to the optical filter, and the optical fiber extending from the optical filter to a transmission terminal of the external connecting optical connector. The fiber-housing tray includes a first ring and a second ring lined up in a width direction of the optical module, and the optical fibers are wound around each of the first ring and the second ring.

Japanese Patent Application Publication No. 2011-118337 discloses an optical transceiver. The optical transceiver includes an optical receptacle, an optical multiplexer, an optical demultiplexer, a tray, two sets of connectors, two sets of holders, four TOSAs, four ROSAs, a circuit board, and a housing. The optical receptacle has a sleeve, and an optical fiber extends from the sleeve. Each of the optical fibers extending from each of the sleeves is connected to each of the optical multiplexer and the optical demultiplexer in an interior of the housing. The optical transceiver further includes four internal optical fibers for transmitting four channels of optical signals from the four TOSAs to the optical multiplexer and four internal optical fibers for transmitting four channels of optical signals from the optical demultiplexer to each of the four ROSAs.

Japanese Patent Application Publication No. 2015-25868 discloses an optical connection structure. The optical connection structure has an optical connector, a sleeve, and an optical plug which is an object to be connected, and the optical connector has a ferrule holding an optical fiber. The optical connection structure is a structure for optically connecting a pair of optical fibers which require adjustment of a rotational angle around an optical axis when the optical connection is performed. Each of the pair of the optical fibers is a multi-core optical fiber or a polarization maintaining optical fiber.

SUMMARY

The present disclosure provides an optical transceiver configured to be pluggable to an apparatus in a first direction. The optical transceiver includes a housing having a rectangular parallelepiped shape and an optical receptacle, the rectangular parallelepiped shape being long in the first direction, the optical receptacle being configured to be out from the apparatus when the optical transceiver is plugged to the apparatus; a plurality of optical subassemblies each having a sleeve that is long in the first direction, each of the plurality of optical subassemblies being configured to perform a photoelectric conversion between an optical signal and an electrical signal, the sleeve facing to the optical receptacle; a plurality of inner fibers each connected to the sleeve one to one; and a tray having a holding part and a guiding part, the holding part being configured to hold the plurality of optical subassemblies in line along a second direction that crosses the first direction, the guiding part being formed on both outer sides of the holding part in the second direction and a folding back area on an opposite side of the optical receptacle. The guiding part includes a pair of passage parts in the outer sides. The housing houses the plurality of optical subassemblies, the plurality of inner fibers, and the tray. Each of the plurality of inner fibers extending from the sleeve passes through one of the pair of passage parts, the folding back area, and another of the pair of passage parts in this order within the tray so as to face the optical receptacle again when the another of the pair of passage parts is closer to the sleeve than the one of the pair of passage parts, and passes through the another of the pair of passage parts, the folding back area, and the one of the pair of passage parts in this order in the tray so as to face the optical receptacle again when the one of the pair of passage parts is closer to the corresponding sleeve than the another of the pair of passage parts.

DETAILED DESCRIPTION

Figure 1:
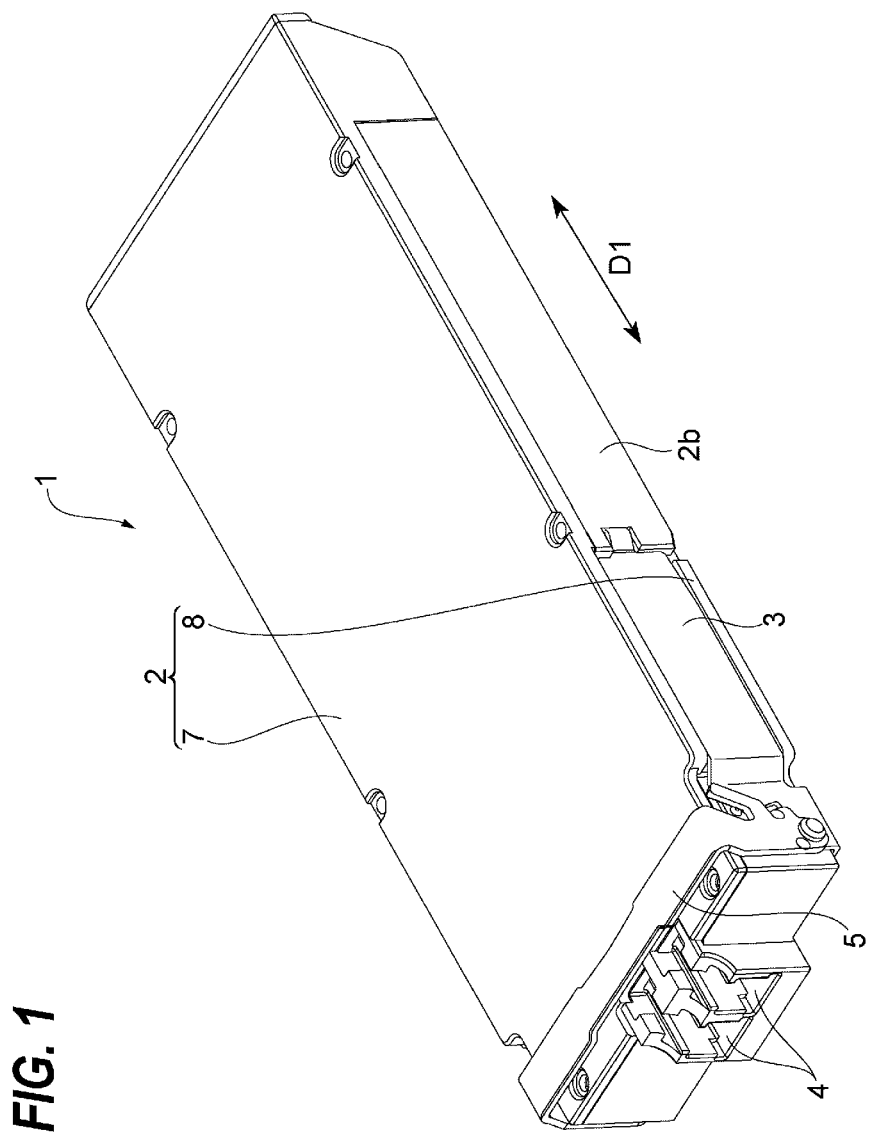
FIG. 1 is a perspective view showing an optical transceiver according to an embodiment of the present disclosure.

Description of the Embodiments of the Disclosure

Specific examples of the present disclosure will be described below with reference to drawings. It should be noted that the present invention is not limited to the following examples, but is indicated by the claims, and it is intended to include all modifications within the scope equivalent to the claims. In the following description, identical reference numerals are used, where possible, to designate identical elements that are common to the figures, and duplicate description is omitted, where possible.

In the optical communication system, with the increase in the capacity of the optical communication network, an optical signal having a multi-valued signal level multi-levels such as PAM4 (4-level Pulse Amplitude Modulation) signal is transmitted from an optical transceiver. In order to realize such a PAM4 transmission, the optical transceiver equips is equipped with a signal-processing IC (Integrated-Circuit) such as DSP (Digital Signal Processor). Power dissipation of the DSP is, for example, about 4 W to 6 W, and in order to keep an operating temperature of the signal-processing IC within a predetermined range, a heat dissipation mechanism for the signal-processing IC is essential. On the other hand, as the optical transceiver, a shift downsizing to a smaller CFP2 (Centum gigabit Form factor Pluggable 2) optical transceiver or the like is proceeding. For example, in CFP2-ER4, four TOSAs (transmitter optical sub-assemblies) and an optical multiplexer are housed inside a housing of the optical transceiver. Each of the four TOSAs and the optical multiplexer are connected to each other by a plurality of optical fibers. In CFP2, the housing is 41.5 mm wide, and it is required to efficiently wire the plurality of optical fibers in the narrow housing. In addition, the every optical fiber is required to be bent with a bending radius greater than the specified bending radius. Thus, for housing the optical fiber, a certain amount of space or more is necessary, and this may restrict the miniaturization downsizing of the optical transceiver. Therefore, it is required to downsize the optical transceiver by efficiently house the optical fiber.

Figure 2:
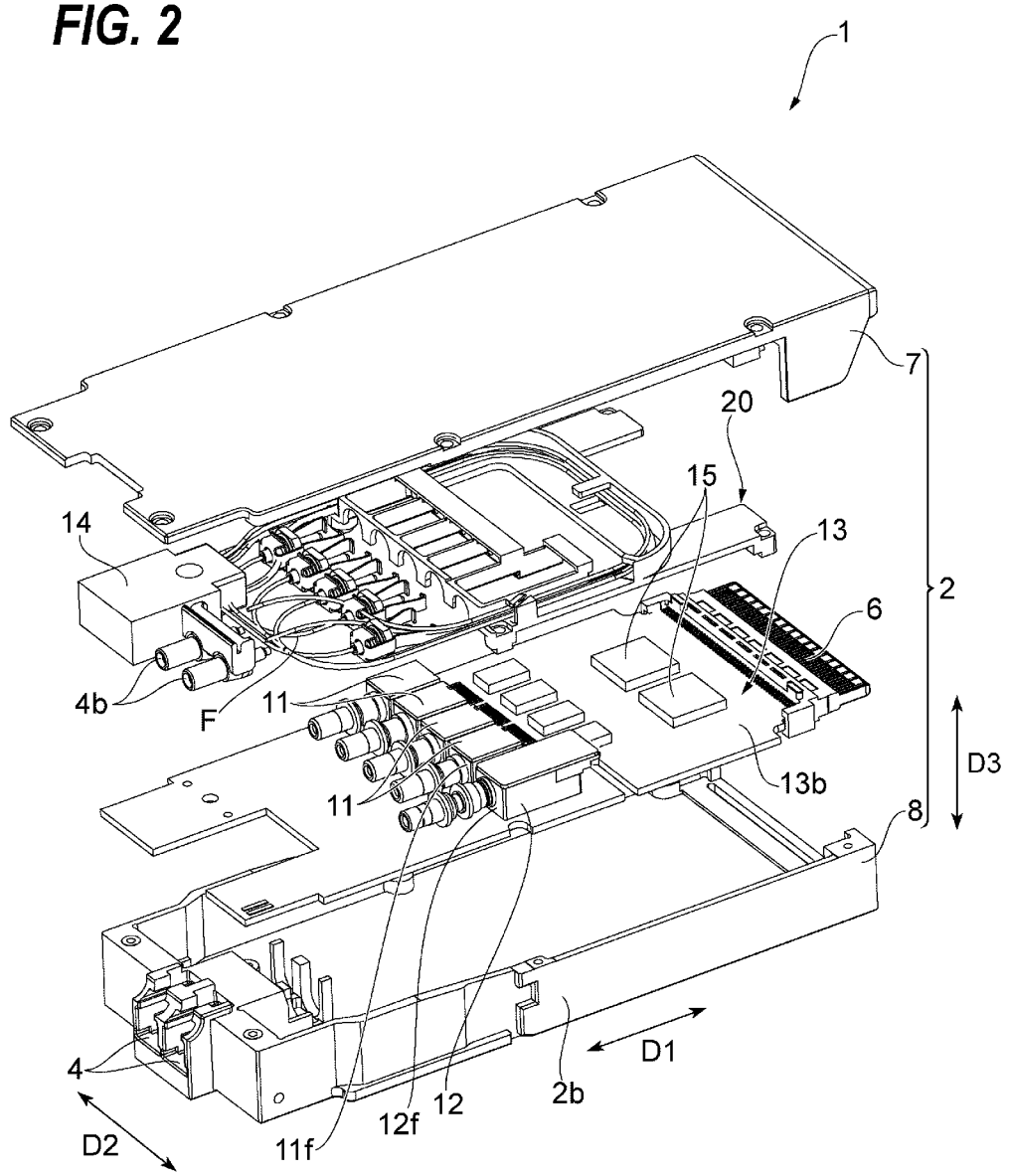
FIG. 2 is an exploded perspective view of the optical transceiver of FIG. 1.

FIG. 1 is a perspective view showing an optical transceiver 1 according to an embodiment. FIG. 2 is an exploded perspective view of the optical transceiver 1. The optical transceiver 1 conforms to, for example, CFP2 standard. The "standard" here is, for example, MSA (Multi-Source Agreement), which is one of the industry-wide standards. As shown in FIG. 1 and FIG. 2, the optical transceiver 1 includes a housing 2, a slider 3, an optical receptacle 4, and a bail 5. The housing 2 is, for example, metallic. The slider 3 engages with the housing 2. The optical receptacle 4 is located at one end of the housing 2. The bail 5 is rotatably attached to the slider 3. In FIG. 2, the slider 3 and the bail 5 are not shown.

The housing 2 has a rectangular parallelepiped shape. The housing 2 extends longitudinally in a direction D1 (first direction) which is a longitudinal direction of the optical transceiver 1. The optical transceiver 1 is pluggable with (inserted into and removed from) a cage provided in a host system (apparatus) along the direction D1. The cage (not shown) has a rectangular parallelepiped shape similar to the shape of the housing 2, and extends longitudinally in the direction D1. Inside of the cage is hollow. The optical transceiver 1 can be housed in the hollow of the cage. The cage has an opening towards the outside of the apparatus. When the optical transceiver 1 is inserted into the cage, the optical transceiver 1 is inserted through the opening into the cage. The cage mainly houses the housing 2, and the optical receptacle 4 and the bail 5 are exposed to the outside of the cage while the housing 2 is housed in the cage. That is, when the optical transceiver 1 is inserted into the cage, one end provided with the optical receptacle 4 along the direction D1 which is a longitudinal direction of the housing 2 and the other end located on the opposite side to the one end move so as to approach the cage (the other end is housed inside the cage). When the optical transceiver 1 is removed from the cage, one end of the housing 2 provided with the optical receptacle 4 moves away from the cage.

The housing 2 has the rectangular parallelepiped shape, and for example, when the housing 2 is cut by a flat surface extending perpendicularly to the direction D1, a surface cut shape of the housing 2 is a rectangular shape. The housing 2 includes an upper housing 7 and a lower housing 8. For example, the slider 3 is provided in a side surface 2b of the lower housing 8 along the direction D1. The upper housing 7 and the lower housing 8 are joined to each other by a plurality of screws, for example, with gaskets interposed therebetween. For example, the lower housing 8 may have a space (an interior space) therein, and upper housing 7 may be bonded to the lower housing 8 so as to cover the interior space. In the following description, "front and rear" and "up and down" directions may be used, but these directions are for convenience based on the illustrated state and do not strictly limit the directions. In the following description, an end of the housing 2 where a vicinity of the optical receptacle 4 is provided is referred to as "front", another end of the housing 2 where an electrical plug 6 described later is provided is referred to as "rear", the direction of viewing the upper housing 7 from the lower housing 8 is referred to as "up", the direction of viewing the lower housing 8 from the upper housing 7 is referred to as "down", and "up and down" is sometimes referred to as "height".

The slider 3 extends along the direction D1 from one end of the housing 2 provided with the optical receptacle 4. The optical transceiver 1 is engaged with the cage when housed in the cage such that it cannot be removed, for example, if an user attempts to remove it from the cage with holding the housing 2. The optical transceiver 1 includes a release mechanism for releasing the engagement with the cage of the host system. The release mechanism includes the slider 3 and the bail 5. The sliders 3 are provided one by one on the side surfaces 2b of the housing 2, and a pair of the sliders 3 is provided as one component. The side surface 2b is, for example, a flat surface that is parallel to the front and rear direction (direction D1) and parallel to the up and down direction (direction D3). The bail 5 is pivotally attached to the slider 3 upwardly and in front of the optical receptacle 4. When the bail 5 is pivoted forward and downward, the slider 3 moves linearly forward along the direction D1, and the engagement of the optical transceiver 1 with the cage is released as the slider 3 moves linearly forward. The release mechanism allows the user to pull the optical transceiver 1 outward from the host system and prevents the optical transceiver 1 from being detached unintentionally.

The optical receptacle 4 receives an external optical connector. The optical transceiver 1 transmits an optical signal to an outside via the optical connector, and receives another optical signal from the outside via the optical connector. The housing 2 is provided with the electrical plug 6 at the other end located opposite to the one end where the optical receptacle 4 is provided. The electrical plug 6 is exposed toward an outside from the other end of the housing 2. The electrical plug 6 is connected to an electrical connector (electrical socket) provided inside the cage when the housing 2 is housed in the cage. When the optical transceiver 1 is inserted into the cage, the electrical plug 6 provided at the rear of the housing 2 is inserted into the opening of the cage. When the electrical plug 6 mates with the electrical connector provided at the back of the cages, the optical transceiver 1 and the host systems are electrically connected to each other. For example, the electrical plug 6 and the electrical connector (electrical socket) of the host system each include a power supply terminal and a ground terminal, and the optical transceiver 1 receives power required for operation from the host system by electrically connecting terminals corresponding to each other.

The optical transceiver 1 receives an electrical signal from the host system via the electrical plugs 6 and electrical connectors (not shown), and converts the electrical signal to an optical signal for transmission. The optical transceiver 1 also converts a received optical signal to a received electrical signal and transmits the received electrical signal to the host system. The optical signal used for the transmission of the information and the high-speed electrical signal to be interconverted with the optical signal may be collectively referred to as main signals. In addition to the main signals, electrical signals for monitoring or controlling the optical transceiver 1 are also communicated with the host system. The electrical plug 6 is adapted to mate with the electrical connector for the power to be supplied from the host system to the optical transceiver 1 or for the electrical signals to be transmitted between the host system and the optical transceiver 1 via the electrical connector (electrical socket). In other words, the optical transceiver 1 is made to be hot pluggable. The optical transceiver 1 is activated by receiving the power from the host system by being hot-plugged into the host system.

Figure 3:
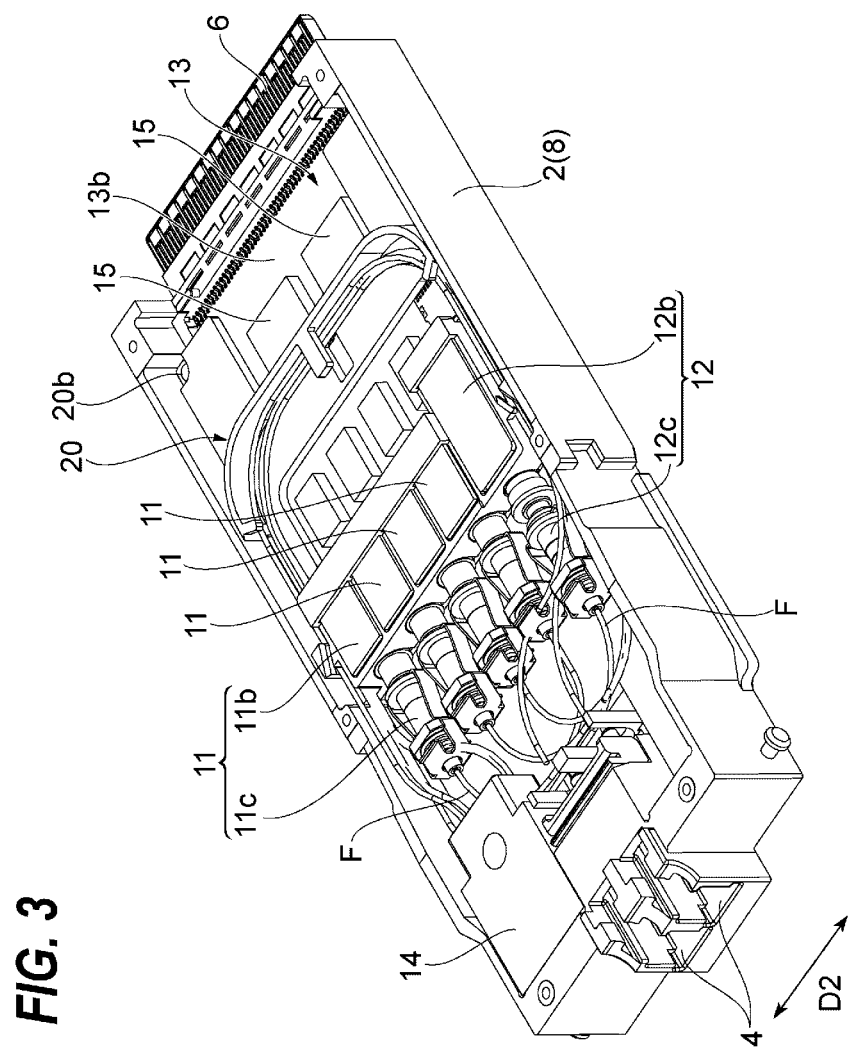
FIG. 3 is a perspective view showing an inner structure of the optical transceiver of FIG. 1.

FIG. 3 is a perspective view showing an inner construction of the optical transceiver 1. As shown in FIG. 2 and FIG. 3, an optical subassembly, an optical fiber (inner fiber) F, a circuit board 13, an optical multiplexer (O-Mux) 14, and a tray 20 are provided inside the housing 2. A plurality of optical sub-assemblies perform photoelectric conversion between the optical signal and the electrical signal, respectively. The optical fiber F is connected to each of the plurality of the optical sub-assemblies. The circuit board 13 is provided with the electrical plug 6 described above. The optical multiplexer 14 is located inside the housing 2 on one side in a direction D2 (second direction), which is a width direction of the optical transceiver 1. The tray 20 guides and houses the optical fiber F. The plurality of optical sub-assemblies includes TOSA (Transmitter Optical Sub-Assembly) 11 and ROSA (Receiver Optical Sub-Assembly) 12. The TOSA 11 and the ROSA 12 are arranged side by side along the direction D2, and for example, one ROSA 12 is arranged at the end of the four TOSAs 11 in the direction D2. The TOSA 11 has a package 11b having a rectangular parallelepiped shape and a sleeve 11c protruding from a side surface of the package 11b. The ROSA 12, like the TOSA 11, has a package 12b and a sleeve 12c. The TOSA 11 and the ROSA 12 are arranged inside the optical transceiver 1 with a front end 11f of the package 11b and a front end 12f of the package 12b aligned along the direction D2. The TOSA 11 and the ROSA 12 perform photoelectric conversions. The TOSA 11 includes, for example, a semiconductor laser diode inside the package 11b, and is an optical transmitter module for converting the electrical signal into the optical signal. The converted optical signal is outputted via the sleeve 11c. The plurality of TOSAs output the optical signals having different peak wavelengths from each other. The ROSA 12 includes, for example, a photodetector (e.g., photodiode) inside the package 12b, and is an optical receiver module for converting the optical signal into the electrical signal. The optical signal to be converted into the electrical signal is inputted to the ROSA 12 via the sleeve 12c.

The optical fiber F is extending from each of the sleeve 11c and the sleeve 12c. For example, the package 12b of the ROSA 12 is greater than the package 11b of the TOSA 11. For example, the sleeve 12c of the ROSA 12 is greater than the sleeve 11c of the TOSA 11. For example, when the side surface from which the sleeve 11c of the package 11b protrudes and a side surface from which the sleeve 12c of the package 12b protrudes are aligned so as to be at the same position in the direction D1, the sleeve 12c extends longer forward (toward the optical receptacle 4) than the sleeve 11c, and the package 12b extends longer rearward (toward the electrical plug 6) than the package 11b. That is, in the direction D1, a length of the package 12b is greater than a length of the package 11b. Also, in the direction D1, a length of the sleeve 12c is greater than a length of the sleeve 11c. Both the TOSA 11 and the ROSA 12 are arranged such that the sleeves 11c and 12c face the front (toward the optical receptacle 4).

Circuit elements such as signal-processing integrated-circuits (signal-processing ICs) for processing the electrical signals are mounted on the circuit board 13. The circuit board 13 is housed in the interior space of the housing 2 such that when the optical transceiver 1 is inserted into the cage, the electrical plug 6 mates with the electrical connector inside the cage. That is, a position of the circuit board 13 in the direction D1 is determined according to a position of the electrical plug 6 mated with the electrical connector. The circuit board 13 has a flat plate shape and has an upper surface 13b. The upper surface 13b is, for example, a flat surface that is parallel to the longitudinal direction (direction D1) and parallel to the widthwise direction (direction D2). A normal direction of the upper surface 13b is, for example, the height direction (direction D3). That is, the electrical plug 6 is disposed with exposing to the outside from the rear of the housing 2. Terminals of the electrical plug 6 are aligned along the direction D2. For example, two DSPs (Digital Signal Processors) 15 are mounted on the upper surface 13b of the circuit board 13. The DSP 15 is, for example, one of the signal-processing ICs that processes the electrical signal received from the host system via the electrical plug 6. The signal-processing IC may be, for example, a CDR (Clock Data Recovery) for shaping a waveform of the electrical signal, or may be a signal-processing IC for generating or identifying PAM4 signals. The optical multiplexer 14 is optically connected to one optical fiber F (second inner fiber) extending from the optical receptacle 4 and four optical fibers F (first inner fibers) towards the respective TOSAs 11. The optical multiplexer 14 multiplexes four optical signals (for each four lanes) having different peak wavelengths from each other into one wavelength-multiplexed optical signal. For example, each optical signal generated by each of the four TOSAs 11 is transmitted to the optical multiplexer 14 via the first inner fiber F corresponding to the TOSA 11, and the wavelength-multiplexed optical signal generated by the optical multiplexer 14 is transmitted to the optical receptacle 4 via one second inner fiber.

Figure 4:
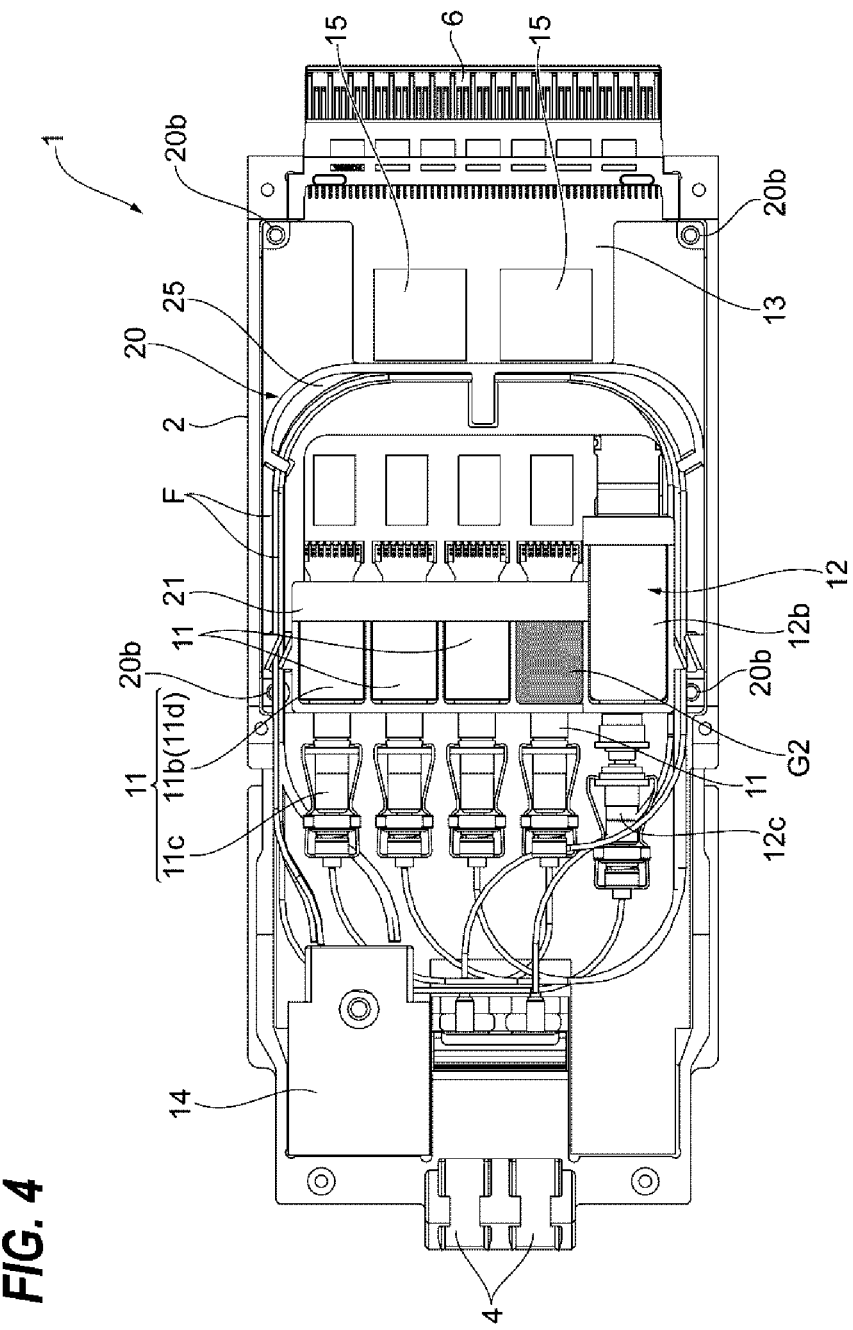
FIG. 4 is a plan view showing the inner structure of the optical transceiver of FIG. 1.
Figure 5:
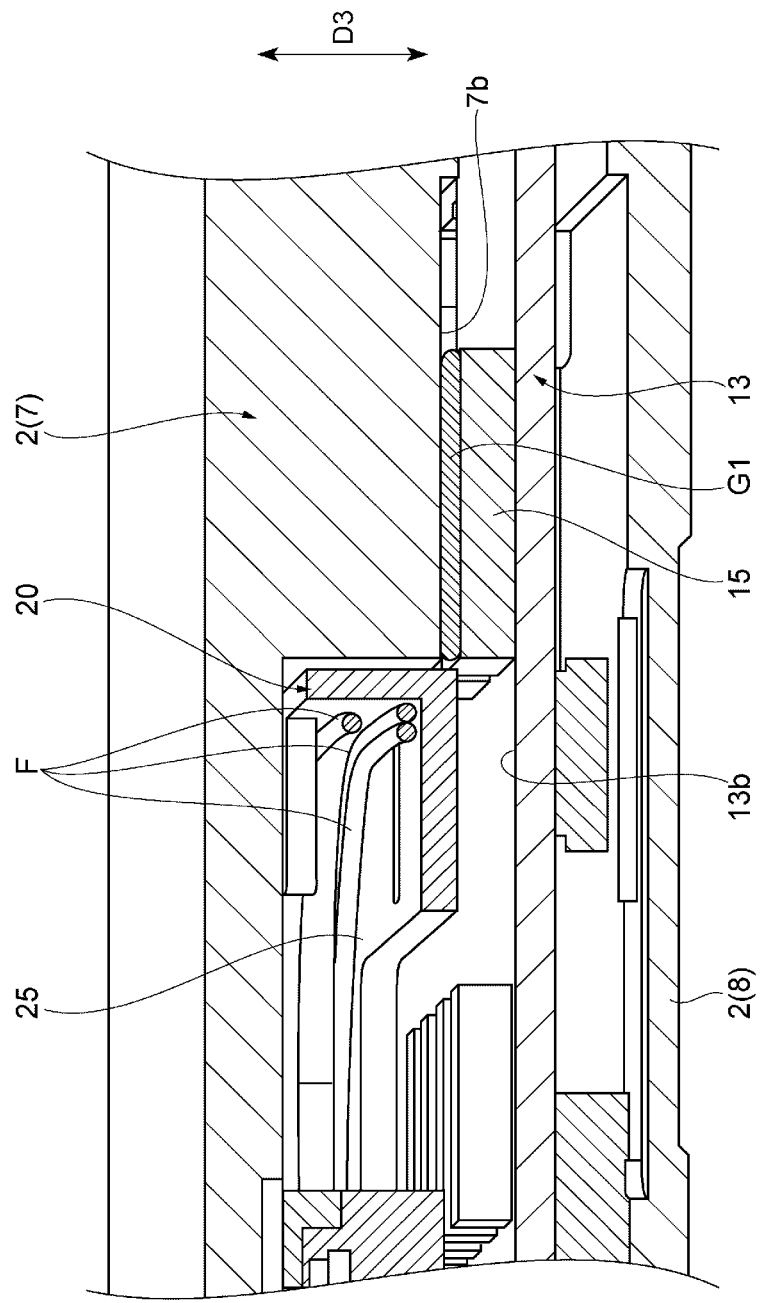
FIG. 5 is a cut surface perspective view showing a housing, a circuit board, a signal-processing IC, and a tray of the optical transceiver of FIG. 1.

FIG. 4 is a plan view showing the inner structure of the optical transceiver 1. FIG. 5 is a cut surface perspective view showing the housing 2, the circuit board 13, the DSP 15, the tray 20 and the optical fibers F. As shown in FIG. 4 and FIG. 5, the tray 20 houses the optical fibers F, and holds the optical subassemblies at their predetermined positions. The tray 20 includes a holding part 21 for holding the optical subassemblies, e.g., the TOSA 11 and the ROSA 12, and a guiding part 25 for guiding the optical fibers F. Each of the optical fibers F extends from each of the plurality of the optical sub-assemblies. The tray 20 is made of, for example, resin. Each of the optical fibers F is routed in the tray 20 so that each of the plurality of optical fibers F is housed into the interior of the housing 2. As shown in FIG. 5, an inner surface 7b of the upper housing 7 faces the upper surface 13b of the circuit board 13. For example, the inner surface 7b is substantially parallel to the upper surface 13b. A heat dissipation member G1 is interposed between the inner surface 7b of the housing 2 (the upper housing 7) and each of the DSPs 15. The heat dissipation member G1 may have a flat plate shape and be attached to the inner surface 7b. In this manner, the inner surface 7b of the upper housing 7 and the DSP 15 mounted on the circuit board 13 are close to each other, and the heat dissipation member G1 is interposed therebetween, thereby forming a heat dissipation path of the DSP 15 to the outside of the optical transceiver 1. The heat dissipation member G1 is flexible and adheres closely to the inner surface 7b of the upper housing 7 and to a top surface of the DSP 15. The heat dissipation member G1 has thermal conductivity and transfers heat of the DSP 15 to the upper housing 7. For example, the heat dissipation member G1 may be a heat-dissipating sheet or a heat-dissipating gel. For example, the heat dissipation member has a thermal conductivity larger than a thermal conductivity of the tray 20. For example, the smaller a distance between the DSP 15 and the inner surface 7b of the upper housing 7 to reduce a length (thickness) in the direction D3 of the heat dissipation member G1, the thermal conductivity of the heat dissipation path is improved. Also, the larger an area in which the heat dissipation member G1 contacts with the top surface of the DSP 15 and an area in which the heat dissipation member G1 contacts with the inner surface 7b of upper housing 7, the better the thermal conductivity of the heat dissipation path. The heat dissipation member G1 may be non-conducting, so that the upper housing 7 and the DSP 15 are insulated from each other.

Figure 6:
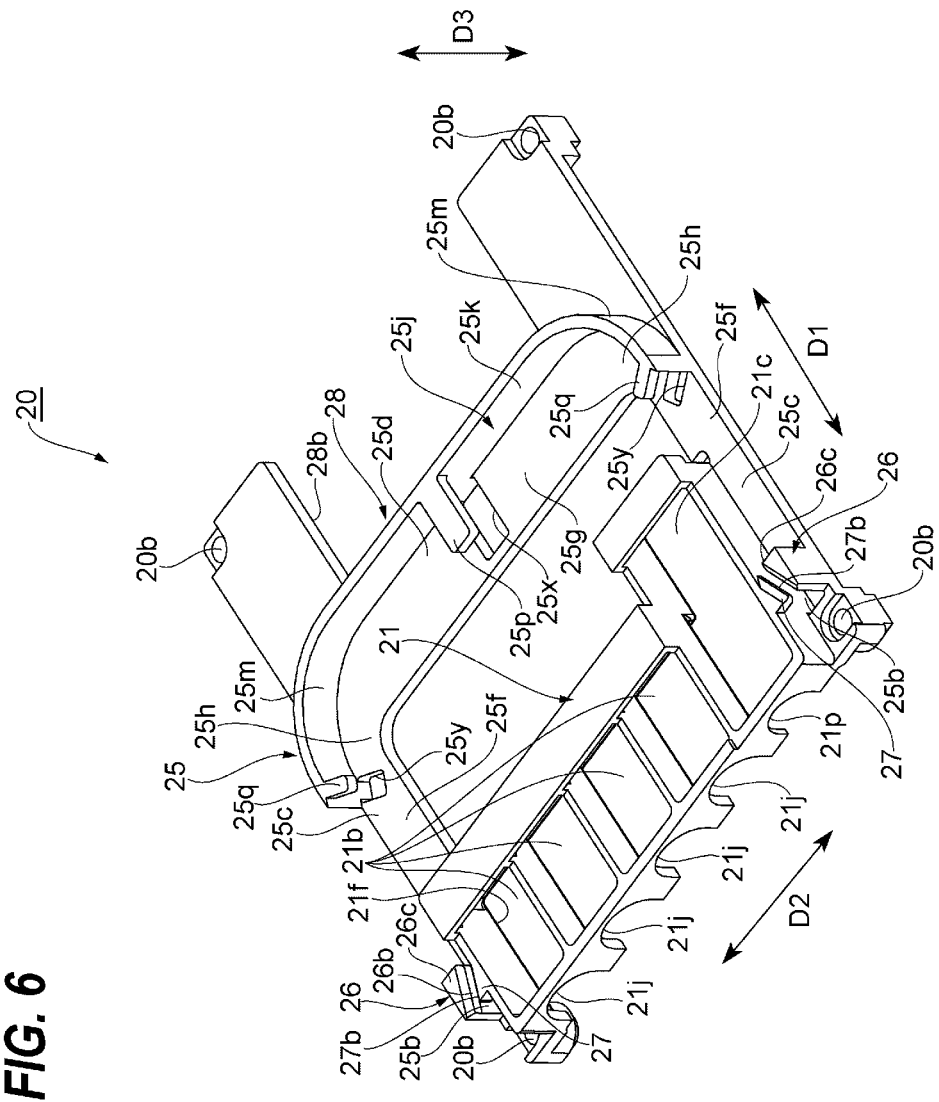
FIG. 6 is a perspective view showing the tray of FIG. 5.
Figure 7:
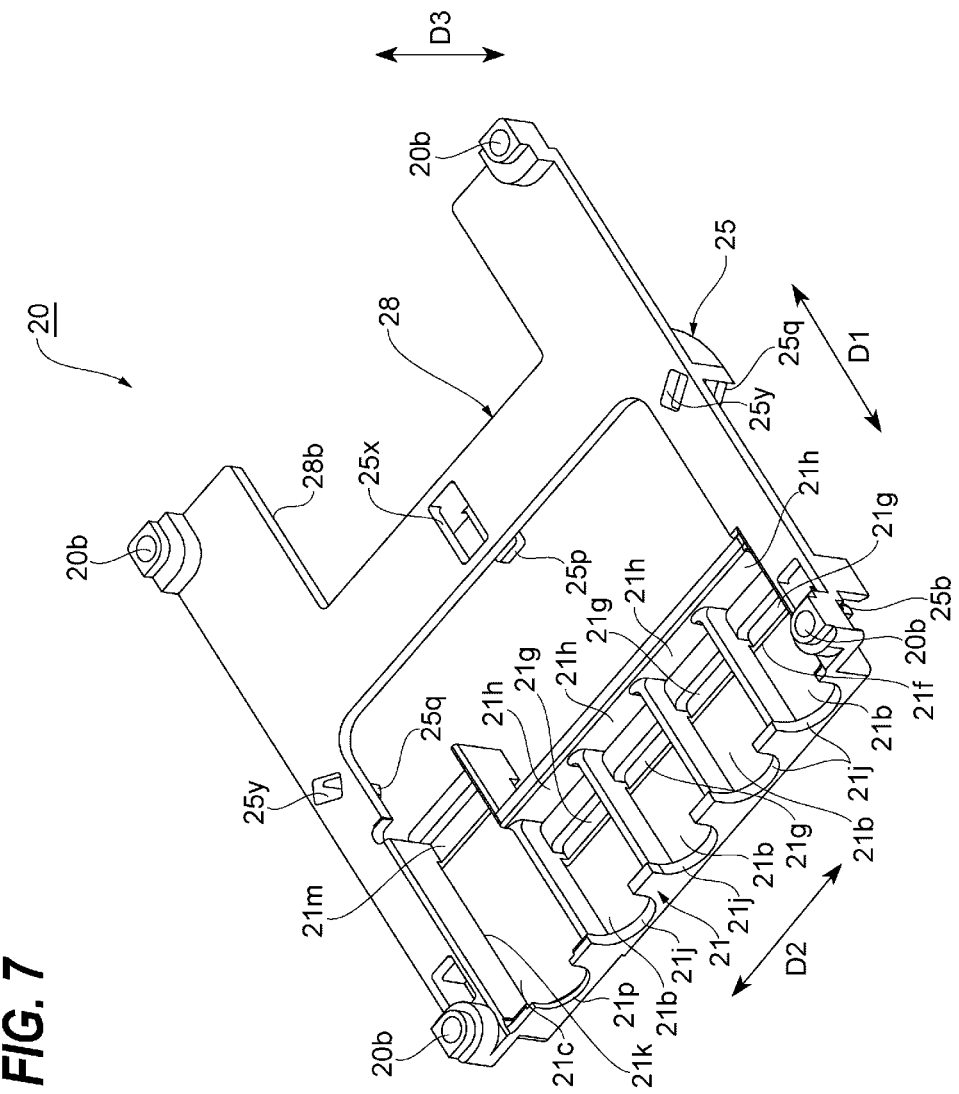
FIG. 7 is another perspective view showing the tray of FIG. 6 viewed from a different direction from FIG. 6.

FIG. 6 is a perspective view showing the tray 20. FIG. 7 is another perspective view showing the tray 20 viewed from the opposite side with respect to the view in FIG. 6. As shown in FIG. 6 and FIG. 7, the tray 20 includes the above-described holding part 21 and the guiding part 25, and a vacant section 28. An outer shape of the tray 20 is, for example, a rectangular plate shape. In the tray 20, the holding part 21, a rear part of the guiding part 25 and the vacant section 28 are arranged in this order from the front, where the optical receptacle 4 is provided, toward the rear, where the electrical plug 6 is provided. The tray 20 has a screw hole 20b at each of four corners. For example, the tray 20 is fixed to the housing 2 by screwing screws (not shown) inserted through the screw holes 20b into threaded holes in the lower housing 8.

The holding part 21 includes a first holding part 21b for holding the TOSA 11 and a second holding part 21c for holding the ROSA 12. For example, the tray 20 has four first holding parts 21b arranged along the direction D2, and the second holding part 21c located at an end of the four first holding parts 21b in the directions D2. Each of the first holding parts 21b and the second holding part 21c has, for example, a rectangular frame shape, and each one end (front end) of the first holding parts 21b and the second holding part 21c is aligned along the direction D2. The other end (rear end) of the second holding part 21c extends longer than the other end of each first holding part 21b toward the rear of the tray 20 in the direction D1. The respective dimensions (i.e., lengths in the direction D1) of the first holding part 21b and the second holding part 21c correspond to the respective longitudinal dimensions of the package 11b of the TOSA 11 and of the package 12b of the ROSA 12. In this embodiment, since the package 12b of the ROSA 12 is larger than the package 11b of the TOSA 11, the second holding part 21c is larger than the first holding part 21b. For example, in the direction D1, the length of the second holding part 21c is greater than the length of the first holding part 21b. The first holding part 21b has side surfaces (including a rear wall part 21h described below) facing the side surfaces of the package 11b of the TOSA 11 in each of the directions D1 and D2, the side surfaces of the first holding part 21b surround a periphery of the package 11b to hold the TOSA 11. Thereby, the TOSA 11 is held in a predetermined position in a surface parallel to the direction D1 and the direction D2 so as not to cause rattling. The second holding part 21c has side surfaces facing the side surfaces of the package 12b of the ROSA 12, and the side surfaces of the second holding part 21c surround a periphery of the package 12b to hold the ROSA 12. Thereby, the ROSA 12 is held in a predetermined position in a surface parallel to the direction D1 and the direction D2 so as not to cause rattling.

The first holding part 21b has a first opening 21f, a mounting surface 21g, the rear wall part 21h, and an arc-shaped part 21j. A surface 11d of the package 11b is exposed from the first opening 21f towards the inner surface 7b of the upper housing 7 (see FIG. 4). The mounting surface 21g is provided at one end in the first opening 21f in the direction D1. As shown in FIG. 7, a part of the surface 11d of the package 11b is placed on the mounting surface 21g. The rear wall part 21h is provided on the rear side of the mounting surface 21g. The arc-shaped part 21j is provided on the front side of the first opening 21f. The first opening 21f is, for example, a rectangular opening (hole) provided in the tray 20. A heat dissipation member G2 is placed inside the first opening 21f (see, e.g., FIG. 4). The surface of the package 11b is thermally connected to the inner surface 7b of the upper housing 7 via the heat dissipation member G2, in a similar manner as the DSP 15. At this time, the inner surface 7b has a step (level difference in the height direction) between the TOSA 11 and the DSP 15, for example, and is connected to the surface 11d of the package 11b and to the top surface of the DSP 15 at different heights (at different positions in the direction D3) via the heat dissipation members G1 and G2. Accordingly, each thickness of the heat dissipation members G1 and G2 may be adjusted separately. For example, a distance between a portion of the inner surface 7b faced to the DSP 15 via the heat dissipation member G1 and the upper surface 13b of the circuit board 13 is smaller than a distance between another portion of the inner surface 7b faced to the package 11b via the heat dissipation member G2 and the upper surface 13b of the circuit board. As a result, a heat dissipation path from the package 11b of the TOSA 11 to the upper housing 7 is formed. The mounting surface 21g is a portion that presses the package 11b toward the lower housing 8. The rear wall part 21h is a portion that separates the holding part 21 and the guiding part 25, and the guiding part 25 is provided each on an area at the rear side of the rear wall part 21h and on both end sides (both outer sides) in the directions D2. The arc-shaped part 21j is a portion to which the sleeve 11c extending from the package 11b is faced, and is formed in an arc shape, for example, in accordance with a cylindrical shape of the sleeve 11c.

The second holding part 21c, like the first holding part 21b, has a first opening 21k, a mounting part 21m, and an arc-shaped part 21p. The package 12b of the ROSA 12 (refer to FIG. 4) is exposed from the first opening 21k towards the inner surface 7b of the upper housing 7. The mounting part 21m is provided behind the first opening 21k and extends in both directions D1 and D2. The arc-shaped part 21p is provided on the front side of the first opening 21k. The first opening 21k has, for example, a rectangular shape similarly to the first opening 21f, and the guiding part 25 is provided on the rear side of the mounting part 21m. The arc-shaped part 21p is a portion where the sleeve 12c extending from the package 12b faces to, and is formed in an arc shape, for example, in accordance with a cylindrical shape of the sleeve 12c, similarly to the sleeve 11c. The package 12b may be thermally connected via a heat dissipation member to the inner surface 7b of the upper housing 7 similarly to the package 11b of the TOSA 11. When the power consumed by the ROSA 12 is relatively low, the package 12b may not be thermally contacted with the inner surface 7b of the upper housing 7.

The guiding part 25 is formed on the both outer sides of the holding part 21 (i.e., on both ends of the tray 20 in the direction D2), and on the folding back area at the rear side of the holding part 21. The rear side is located on an opposite side of the optical receptacle 4 with respect to the holding part 21. The folding back area extends in the directions D1 and D2. The folding back area may be parallel to the upper surface 13b of the circuit board 13. The guiding part 25 guides multiple optical fibers F so that the optical fibers F pass through outer sides of the holding part 21 in the direction D2 and through the rear side of the holding part 21. The guiding part 25 includes a pair of passage parts 25b, a pair of first guiding parts 25c, and a second guiding part 25d. The passage parts 25b are provided on both sides of the direction D2 of the holding part 21 and are aligned with each other along the direction D2. The first guiding parts 25c extend rearwardly from the passage parts 25b. The second guiding part 25d extends along the direction D2 behind the pair of first guiding parts 25c. Each of the first guiding parts 25c has a plate-like part 25f extending in the direction D1, the second guiding part 25d has a plate-like part 25g extending in the direction D2, and each of the plate-like part 25f and the plate-like part 25g is loaded with the plurality of optical fibers F. A curved part 25h is provided between the plate-like part 25f and the plate-like part 25g. For example, the optical fiber F extending along the direction D1 in the plate-like part 25f extends along the direction D2 in the plate-like part 25g after passing through the curved part 25h. Also, the optical fiber F extending along the direction D2 in the plate-like part 25g extends along the direction D1 in the plate-like part 25f after passing through the curved part 25h. As described above, each of the plurality of optical fibers F is mounted on the curved part 25h, whereby a bending radius of each optical fiber F can be set to a predetermined value (the specified value) or more. Therefore, it is possible to bend the respective optical fiber F at a bending radius equal to or larger than the specified value. Therefore, it is possible to avoid an increase in the loss due to bending stress (bending loss).

The second guiding part 25d has a wall part 25j extending towards the upper housing 7 in front of the DSP 15 in the direction D1. The wall part 25j includes a first wall part 25k and a second wall part 25m. The first wall part 25k extends along the direction D2. The second wall part 25m curves from each end in the direction D2 of the first wall part 25k toward an adjacent first guiding part 25c. From the first wall part 25k, a first protrusion part 25p projects toward a center of the tray 20. From the second wall part 25m, a second protrusion part 25q extends centrally of the tray 20. That is, the second guiding part 25d has, for example, the first protrusion part 25p formed at the center of the direction D2 and the second protrusion part 25q formed at each of both ends of the direction D2. The first protrusion part 25p and the second protrusion part 25q prevent the optical fibers F guided in the guiding part 25 from bulging out of the guiding part 25 along the direction D3. Under the first protrusion part 25p, a hole 25x penetrating through the tray 20 is formed toward the lower housing 8. Under the second protrusion part 25q, a hole 25y penetrating through the plate-like part 25f is formed toward the lower housing 8. The vacant section 28 has a recess part 28b (second opening) in which the DSP 15 is exposed toward the upper housing 7. The recess part 28b has, for example, a rectangular shape having one long side extending in the direction D2 and a pair of short sides extending rearward from both ends of the long side. For example, one rear side in the direction D1 of the tray 20 forms the recess part 28b in which a central portion in the direction D2 of the one rear side is disposed forwardly with respect to both ends of the central portion. Thereby, the recess part 28b provides a vacant space to the vacant section 28, so that the DSP 15 is exposed to the inner surface 7b of the upper housing 7. Thus, the tray 20 has the recess part 28b in which the central portion of the rear side is concave toward the holding part 21. More specifically, a distance between the holding part 21 and the long side of the recess part 28b is shorter than a distance between the holding part 21 and the screw hole 20b of the tray 20.

Figure 8:
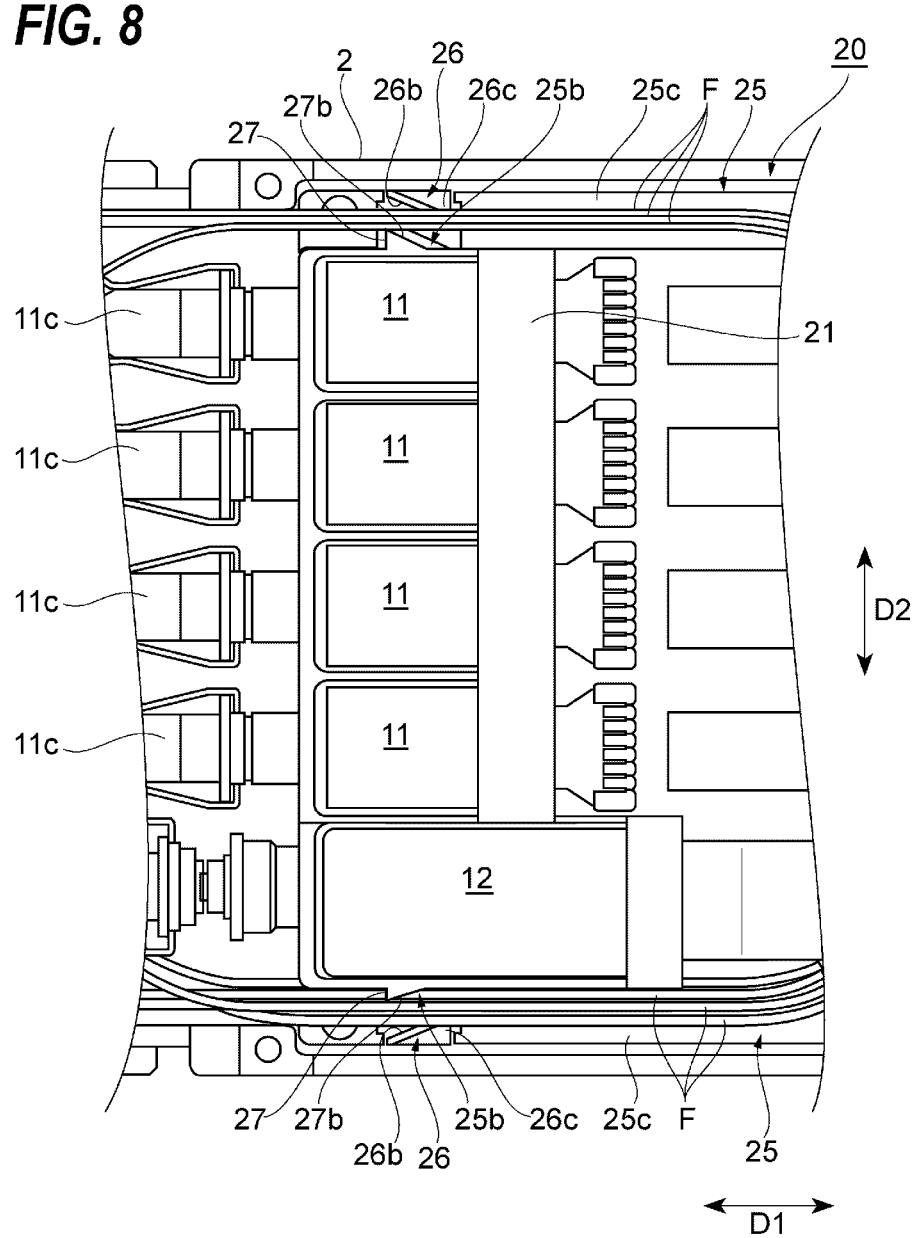
FIG. 8 is an enlarged plan view of a holding part of a tray and a passage part of a guiding part shown in the plan view of FIG. 4.

FIG. 8 is an enlarged plan view of the passage part 25b of the tray 20. As shown in FIG. 6 and FIG. 8, each passage part 25b is a side passage that allows each of the plurality of the optical fibers F to pass between a space in front of the tray 20 and the guiding part 25 of the tray 20 through exteriors (both outer sides) of the holding part 21 in the direction D2. For example, the optical fiber F enters the first guiding part 25c through the passage part 25b from the front of the tray 20, and enters the front of the tray 20 through the passage part 25b from the first guiding part 25c. In order to be connected to the passage part 25b, a part of the first guiding part 25c is provided on the outer side of the holding part 21 in the direction D2. Since the housing 2 according to the present embodiment is miniaturized, a width in the direction D2 of one of the passage part 25b, as an example, is 3 mm or less. However, by passing the plurality of optical fibers F through the first guiding part 25c and the second guiding part 25d through the respective passage part 25b, it is possible to house the optical fibers F efficiently in the interior space of the miniaturized housing 2. Each passage part 25b has, for example, wall parts 26 located on the outer sides (both ends) of the tray 20 in the direction D2 and protrusion parts 27 located on the outer sides of the holding part 21 in the direction D2. The wall part 26 has a protrusion part 26c projecting centrally in the tray 20 in the direction D2. For example, the protrusion part 26c has a slope part 26b. The slope part 26b slopes outwardly (toward outside) in the direction D2 toward the front side. Specifically, the slope part 26b leans to the second direction D2 from the first direction D1. The protrusion part 27 has an end surface 27b. The end surface 27b slopes outward in the direction D2 toward the front side. Therefore, the end surface 27b of the protrusion part 27 and the slope part 26b of the wall part 26 facing to the protrusion part 27 are inclined outward in the direction D2 as extending toward the front side. For example, when the tray 20 is viewed in a plan view from the direction D3, the slope part 26b may be formed so as to be parallel to the end surface 27b.

Figure 9:
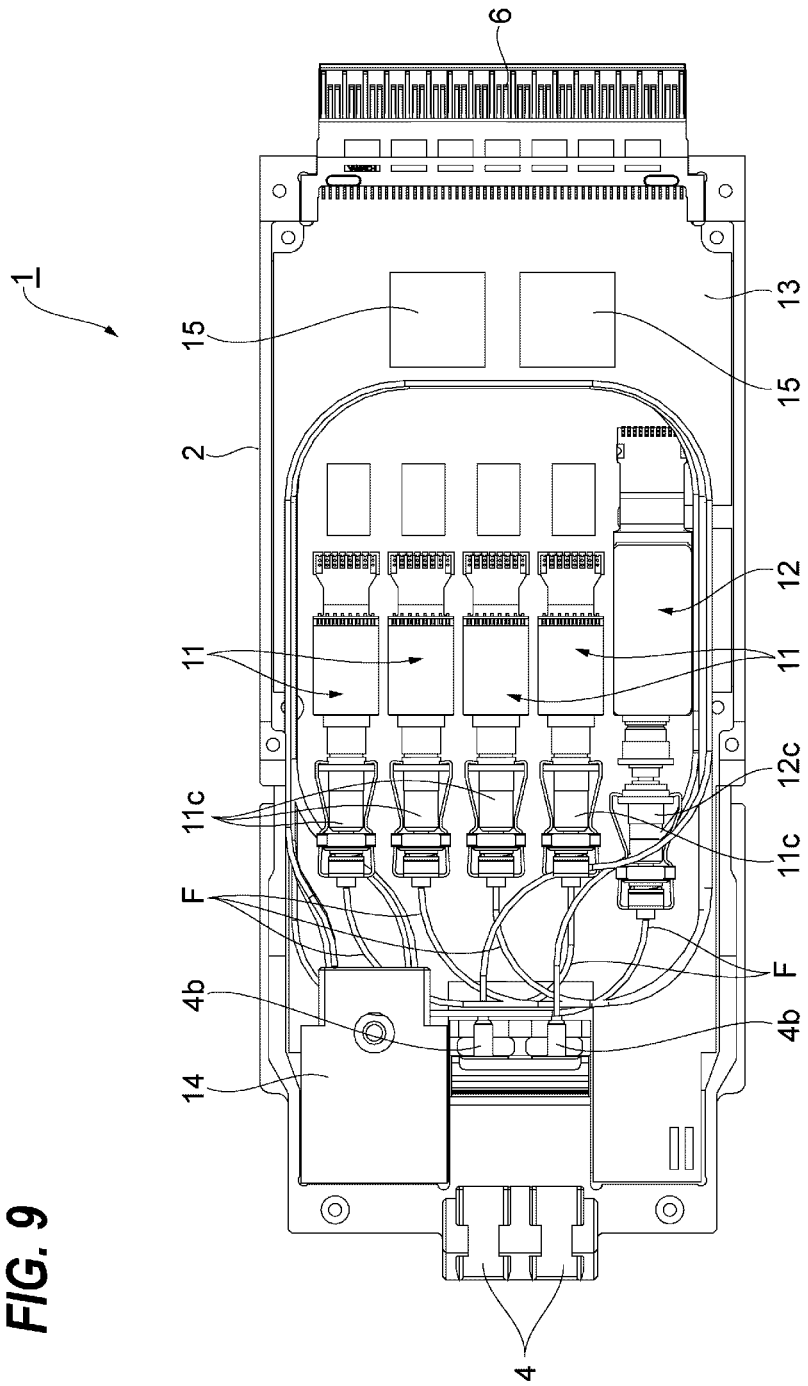
FIG. 9 is a plan view showing a state that the tray is removed from the optical transceiver of FIG. 4.

Referring to FIG. 8 and FIG. 9, space-saving installation of the optical fibers F in the optical transceiver 1 configured as above will now be described. FIG. 9 is a plan view showing an inner structure of the optical transceiver 1. However, in FIG. 9, the tray 20 is omitted in order to explain the state of the optical fibers F. The optical fiber F connected to the sleeve 11c of the respective TOSA 11 extends forward from the sleeve 11c, and is turned back 180 degrees to enter one of the pair of the passage parts 25b. For example, in case a bending radius of the optical fiber F becomes smaller than the predetermined radius when it enters into one of the pair of the passage parts 25b from the sleeve 11c to which it is connected, the optical fiber F enters the other of the pair of the passage parts 25b from the sleeve 11c to which it is connected. In such a case, the other of the pair of the passage parts 25b is farther than the one of the pair of the passage parts 25b with respect to the sleeve 11c, thereby increasing the bending radius of the optical fiber F. The optical fiber F connected to the sleeve 12c of the ROSA 12 also enters the selected passage part 25b in the same manner as described above. For example, the optical fiber F extending from the TOSA 11 positioned proximate to one passage part 25b travels forward and then turns 180 degrees to pass through the other passage part 25b and to enter the tray 20. Also, the optical fiber F extending from another TOSA 11 positioned proximate to the other passage part 25b travels forward and then is folded back 180 degrees to pass through the one passage part 25b and to enter the tray 20. The optical fiber F connected to sleeve 12c of ROSA 12 also enters the passage part 25b in the same manner as described above. For example, the optical fiber F extending from the ROSA 12 positioned proximate to one passage part 25b travels forward and then turns 180 degrees to pass through the other passage part 25b and enter tray 20. For example, when the holding part 21 is divided into two regions with the center as a boundary in the direction D2, the optical fiber F enters the passage part 25b of a region that differs from a region in which the TOSA 11 or the ROSA 12 connected to the optical fiber F is included. Incidentally, for the TOSA 11 located near the center, when the bending radius is larger than the predetermined value, the optical fiber connected to the TOSA 11 may enter the passage part 25b of the region containing the TOSA 11.

The plurality of optical fibers F that has entered the interior of the tray 20 from the passage part 25b of one of the pair of the passage parts 25b is covered by the protrusion part 26c and the protrusion part 27 of the passage part 25b. The plurality of optical fibers F entering one passage part 25b extends rearwardly on one of the first guiding part 25c, and are bent in the direction D2 on the second guiding part 25d, and are folded back forwardly along the other of the first guiding part 25c. The plurality of optical fibers F entering the tray 20 through the one passage part 25b turns 180 degrees going around the ROSA 12 and the plurality of the TOSAs 11 from rearward to forward, and extends toward the optical receptacle 4 out of the tray 20 through the other passage part 25b. Each of the optical fibers F extending from each of the sleeves 11c of the TOSAs 11 toward the optical receptacle 4 through the guiding part 25 is connected to the optical multiplexer 14. On the other hand, the optical fiber F extending from the sleeve 12c of the ROSA 12 toward the optical receptacle 4 through the guiding part 25 is connected to the sleeve 4b of the optical receptacle 4. In addition to the optical fiber F connected to the sleeve 12c of the ROSA 12, another optical fiber F connected to the optical multiplexer 14 extends from the sleeve 4b. The optical fiber F extending from the sleeve 4b is bent toward one side of the transceiver 1 in the direction D2 through one of the passage parts 25b into the guiding part 25 of the tray 20, and turns around the plurality of TOSAs 11 and the ROSA 12 by 180 degrees through the other passage part 25b, and then extends toward the optical multiplexer 14 from the guiding part 25.

Next, effects obtained from the optical transceiver 1 will be described in detail. The optical transceiver 1 includes the housing 2 having a rectangular parallelepiped shape, and is provided with the optical receptacle 4 at one end of the housing 2 in the direction D1. The optical transceiver 1 includes the TOSA 11 having the sleeve 11c extending in the direction D1, the ROSA 12 having the sleeve 12c extending in the direction D1, and the plurality of optical fibers F having one end connected to each of the plurality of the sleeves 11c, 12c. Each of the plurality of TOSAs 11 and the ROSA 12 is held side by side along the direction D2 by the holding part 21 of the tray 20, and the tray 20 has the guiding part 25 for guiding each of the plurality of optical fibers F. The guiding part 25 has the pair of the passage parts 25b disposed on each of the outsides of the plurality of TOSAs 11 and the ROSA 12 in the direction D2 for passing each of the plurality of optical fibers F therethrough.

Each of the optical fibers F extends from a corresponding one of the sleeves 11c and 12c, and is folded 180 degrees back to the opposite side of the optical receptacles 4 to enter the guiding part 25 through the one of the passage parts 25b. In the guiding part 25, the optical fiber F turns around the holding part 21 which holds the ROSA 12 and the plurality of TOSAs 11. Then, the optical fiber F passes through the other of the passage parts 25b before exiting the guiding part 25, and extends toward the optical receptacles 4. Thus, each of the optical fibers F extending from the sleeves 11c and 12c facing towards the optical receptacles 4 is guided to curve to the other side of the optical receptacles 4, to turn around the ROSA 12 and the plurality of TOSAs 11 by the guiding part 25 of the tray 20, and then to extend to the optical receptacles 4 through the other of the passage part 25b. The optical fibers F may wrap more than one turn around the ROSA 12 and the plurality of TOSAs 11, depending on their respective lengths. The plurality of optical fibers F are wired so as to pass through the pair of passage parts 25b between the guiding part 25, which is extending from the rear side of the holding part 21 to the signal-processing IC mounted on the circuit board 13, and a space provided between the optical receptacle 4 and the plurality of optical subassemblies, and to circulate around the TOSAs 11. Such an installation allows the optical transceiver 1 to efficiently house the plurality of optical fibers F in the interior space of the housing 2. Further, the optical fiber F extending from each of the sleeves 11c and 12c enters the passage part 25b farther from each of the sleeves 11c and 12c so that the bend radii are greater than a predetermined value. Therefore, by providing the pair of passage parts 25b on the outer side of the TOSAs 11 in the direction D2, the optical fiber F can be largely rotated inside the housing 2 in the far passage part 25b, so that the bending loss of the optical fiber F can be suppressed.

The passage part 25b may have the protrusion part 27 retaining the plurality of optical fibers F within the passage part 25b in the direction D3, and have the slope part 26b inclined toward both ends of the direction D2 toward the front side. In this instance, the optical fiber F passing through the passage part 25b is covered by the protrusion part 27, thereby reducing the possibility of the optical fiber F bulging out of the passage part 25b. The passage part 25b has the slope part 26b inclined outward in the optical receptacle 4 in the direction D2. Therefore, since the optical fiber F extending in the optical receptacle 4 direction from each of the sleeves 11c and 12c is bent to extend to the signal-processing IC on the other side of the optical receptacle 4 in the direction D1, the bending radii of each optical fiber F can be increased, thereby suppressing bending loss of the optical fiber F.

The optical transceiver 1 may also include the optical multiplexer 14 located on one side of the optical receptacles 4, which are arranged along the direction D2, and the plurality of optical subassemblies may include two TOSAs 11 or more and at least one ROSA 12. In this instance, it is possible to efficiently perform wiring of the optical fibers F in the optical transceiver 1 including the optical multiplexer 14 disposed at one end of the optical receptacle 4 in the direction D2, the plurality of TOSAs 11, and the one or more ROSAs 12.

Also, the holding part 21 of the tray 20 may have the first opening 21f, and the respective TOSA 11 may be contacted with the inner surface 7b of the housing 2 via the heat dissipation member G2 inside the first opening 21f. Incidentally, in the TOSA 11, the optical power to be output is increased with increasing speed of the signal and transmission distance, there is a tendency that the power consumption is increased with this. Therefore, the TOSA 11 tends to become high temperature by Joule heat. However, as described above, each TOSA 11 is disposed in the first opening 21f of the holding part 21 of the tray 20, and each TOSA 11 contacts with the inner surface 7b of the housing 2 via the heat dissipation member G2 while being disposed in the first opening 21f. Since each TOSA 11 thermally contacts with the inner surface 7b of the housing 2 via the first opening 21f of the tray 20 and the heat dissipation member G2, a thermal path from each TOSA 11 to the housing 2 can be ensured. Therefore, the optical transceiver 1 can enhance the heat dissipation of Joules heat generated by the respective TOSA 11.

The optical transceiver 1 also includes the DSP 15 for treating electrical signals, the housing 2 having the electrical plug 6 at the opposite end of the optical receptacle 4 in the direction D1. The DSP 15 is arranged between the plurality of OSAs (the plurality of TOSAs 11 and the ROSA 12) and the electrical plugs 6 in the direction D1. The tray 20 has the recess part 28b. The DSP 15 is thermally connected to the inner surface 7b of the housing 2 via the heat dissipation member G1 inside the recess part 28b. The DSP 15, in particular in recent years, tends to consume more power with increasing speed of the signaling, tends to become high temperature by Joule heat. Then, as described above, the DSP 15 is disposed on the recess part 28b of the tray 20, and the DSP 15 thermally contacts the inner surface 7b of the housing 2 via the recess part 28b and the heat dissipation member G1. Therefore, it is possible to ensure the heat path from the DSP 15 to the housing 2, so that the optical transceiver 1 can increase the heat dissipation of the Joule heat caused by the DSP 15.

The guiding part 25 also houses each of the plurality of optical fibers F so that the bending radius of each optical fiber F is equal to or greater than a predetermined value. Therefore, by housing each optical fiber F in the guiding part 25 of the tray 20, it is possible to reliably maintain the bending radius of each optical fiber F at predetermined values or more. As a result, it is possible to further reliably suppress the bending loss of the respective optical fiber F.

An embodiment of the optical transceiver according to the present disclosure has been described. However, the present invention is not limited to the embodiments described above. In other words, it is readily recognized by those skilled in the art that the present invention can be variously modified and changed within the scope of the appended claims. For example, shapes, sizes, materials, numbers, and housing arrangements of the respective parts of the optical transceiver can be changed as appropriate.

For example, in the foregoing embodiment, the optical transceiver 1 having four TOSAs 11 and one ROSA 12 has been described. However, the number of the TOSA and the number of ROSA can be appropriately changed. Further, in the above-described embodiment, the optical transceiver 1 having the bails 5 provided on both the left and right sides of the housing 2 has been described. However, for example, instead of the bail, a pull tab which can be pulled out with respect to the housing may be provided, and the same effects as described above can be obtained even in the optical transceiver where the pull tab is provided. As described above, the configuration of the respective components of the optical transceiver can be appropriately changed. In the above-described embodiment, the optical transceiver 1 conforming to CFP2 standard has been described. However, the optical transceiver according to the present invention may be an optical transceiver conforming to a standard other than CFP2 standard.

What is claimed is:

1. An optical transceiver configured to be pluggable to an apparatus in a first direction, the optical transceiver comprising:
   a housing having a rectangular parallelepiped shape and an optical receptacle, the rectangular parallelepiped shape being long in the first direction, the optical receptacle being configured to be out from the apparatus when the optical transceiver is plugged to the apparatus;
   a plurality of optical subassemblies each having a sleeve that is long in the first direction, each of the plurality of optical subassemblies being configured to perform a photoelectric conversion between an optical signal and an electrical signal, the sleeve facing to the optical receptacle, the plurality of optical subassemblies being housed in the housing;
   a plurality of inner fibers each connected to the sleeve one to one, the plurality of inner fibers being housed in the housing; and
   a tray housed in the housing, the tray having a holding part and a guiding part, the holding part being configured to hold the plurality of optical subassemblies in line along a second direction that crosses the first direction, the guiding part being formed on both outer sides of the holding part in the second direction and a folding back area on an opposite side of the optical receptacle in the first direction, the guiding part including a pair of passage parts on the outer sides of the holding part,
   wherein only the pair of passage parts allows every single of the inner fibers extending from the sleeve thereof to enter the folding back area.

2. The optical transceiver according to claim 1,
   wherein each of the passage parts includes a protrusion part and a slope part,
   wherein the protrusion part retains the plurality of inner fibers in the passage part, and
   wherein the slope part leans to the second direction from the first direction.

3. The optical transceiver according to claim 1 further comprising:
   an optical multiplexer optically connected between the optical receptacle and the plurality of the optical subassemblies,
   wherein the optical receptacle includes a first receptacle and a second receptacle both arranged along the second direction,
   wherein the optical multiplexer is located on one side of the first receptacle and the second receptacle in the second direction, and
   wherein the plurality of optical subassemblies includes two transmitter optical sub-assemblies or more and a receiver optical sub-assembly.

4. The optical transceiver according to claim 3,
wherein the holding part of the tray has a first opening,
wherein each of the transmitter optical sub-assemblies is thermally connected to an inner surface of the housing via a heat dissipation member inside the first opening, and
wherein the heat dissipation member has a thermal conductivity larger than a thermal conductivity of the tray 20.

5. The optical transceiver according to claim 1 further comprising:
   a signal-processing integrated-circuit (IC) that processes the electrical signal,
   wherein the housing has an electrical plug at an end opposite to the optical receptacle in the first direction,
   wherein the signal-processing IC is arranged between the plurality of optical sub-assemblies and the electrical plug in the first direction,
   wherein the tray has a recess part between the folding back area and the electrical plug in the first direction,
   wherein the signal-processing IC is connected to an inner surface of the housing via a heat dissipation member inside the recess part, and
   wherein the folding back area is arranged between the holding part and the recess part in the first direction and is connected to the pair of passage parts, so that every single of the inner fibers is folded back toward the optical receptacle in the folding back area.

6. The optical transceiver according to claim 1,
wherein the guiding part houses the plurality of inner fibers so that a bending radius of each of the plurality of inner fibers is equal to or greater than a predetermined value.

* * * * *